United States Patent [19]

Kitano

[11] 4,436,845

[45] Mar. 13, 1984

[54] TRAFFIC MARKING PAINT

[75] Inventor: Masao Kitano, Osaka, Japan

[73] Assignee: Toa Paint Co., Ltd., Osaka, Japan

[21] Appl. No.: 436,387

[22] Filed: Oct. 25, 1982

[30] Foreign Application Priority Data

Oct. 29, 1981 [JP] Japan ................................ 56-174020

[51] Int. Cl.$^3$ .................... C09D 5/00; C09D 3/48; E01F 9/04; E01F 9/08
[52] U.S. Cl. ................................. 523/172; 524/457; 524/476
[58] Field of Search .................. 523/172; 260/998.19; 524/457, 476

[56]  References Cited

U.S. PATENT DOCUMENTS

| Re. 28,531 | 8/1975 | Vries ................................ 260/998.19 |
| Re. 30,463 | 12/1980 | Miller et al. ........................ 523/172 |
| 3,228,897 | 1/1966 | Nellessen ........................ 260/998.19 |
| 3,880,796 | 4/1975 | Christenson et al. ............... 524/457 |
| 3,928,266 | 12/1975 | Scohy et al. ......................... 523/172 |
| 3,966,667 | 6/1976 | Sullivan ................................ 524/476 |
| 4,208,465 | 6/1980 | Chang ................................ 428/463 |
| 4,234,466 | 11/1980 | Takahashi et al. .................. 525/481 |
| 4,297,450 | 10/1981 | Sato et al. ........................... 525/190 |
| 4,302,561 | 11/1981 | Becher et al. ....................... 525/379 |
| 4,340,511 | 7/1982 | Backhouse et al. ................. 524/504 |
| 4,355,071 | 10/1982 | Chang ................................. 525/293 |
| 4,362,770 | 12/1982 | Mathai et al. ....................... 524/379 |
| 4,378,445 | 3/1983 | Brasen et al. ....................... 524/284 |

FOREIGN PATENT DOCUMENTS

| 48-67328 | 9/1973 | Japan ................................... 523/172 |
| 53-54237 | 5/1978 | Japan .............................. 260/998.19 |

OTHER PUBLICATIONS

Derwent Abs. 40292X/22, (DT2454000), 5-1976.
Derwent Abs. 28949X/16 (J51025551), 3-1976.
Derwent Abs. 05127D/04, (SU734238), 5-1980.

Primary Examiner—Melvyn I. Marquis
Assistant Examiner—Herbert J. Lilling
Attorney, Agent, or Firm—Armstrong, Nikaido, Marmelstein & Kubovcik

[57]  ABSTRACT

A traffic marking paint having an excellent drying property comprising a non-aqueous resin dispersion, a filler and a pigment. The traffic paint can be used with or without glass beads, and can be quickly dried without remaining the inside portion of the coated paint layer in the undried state.

1 Claim, No Drawings

TRAFFIC MARKING PAINT

BACKGROUND OF THE INVENTION

The present invention relates to a traffic marking paint of non-aqueous dispersion type.

A traffic paint of non-aqueous dispersion type has the advantages that it is low in viscosity and high in solid content and can be quickly dried, and that a hydrocarbon solvent which is photochemically inert, is usable. However, the paint has the drawback that if it is thickly coated, a film is formed on the surface area due to quick drying and a solvent is hard to evaporate from the inside. In order to eliminate this drawback, it is proposed to incorporate about 20% by weight of glass beads in the paint, thereby securing the apparent quick drying property.

It is a primary object of the present invention to provide a traffic marking paint of a non-aqueous dispersion type having an excellent drying property without using glass beads.

This and other objects of the present invention will become apparent from the description hereinafter.

SUMMARY OF THE INVENTION

In accordance with the present invention, there is provided a traffic marking paint comprising 10 to 40% by weight of a non-aqueous dispersion of a resin having a glass transition temperature of 20° to 70° C., 40 to 60% by weight of a filler, and a pigment.

The traffic marking paint of the invention can be quickly dried without remaining the inside portion of the coated paint layer in the undried state.

DETAILED DESCRIPTION

The term "non-aqueous resin dispersion" as used herein means a dispersion in which a resin is dispersed in an organic solvent, unlike an aqueous latex or emulsion in which a resin is dispersed in water.

Non-aqueous dispersions of resins having a glass transition temperature of 20° to 70° C. are usable in the invention. The non-aqueous dispersions are prepared by known processes, e.g. a process in which a dispersant such as an alkyd resin and a dispersoid such as an acrylic monomer are dissolved or dispersed in a dispersion medium such as an aliphatic hydrocarbon solvent and the polymerization is conducted, and a process in which the dispersant is first formed by polymerization and the dispersoid is then added to the reaction mixture and polymerized. In order to obtain non-aqueous resin dispersions suitable for attaining the objects of the invention, an aliphatic hydrocarbon such as hexane, heptane or cyclohexane and an aromatic hydrocarbon such as toluene or xylene are preferably employed in the invention as a dispersion medium. These mediums may be employed alone or in admixture thereof. Resins having a certain degree of reactivity are preferably employed as a dispersant, e.g. an acrylic resin such as polymethyl methacrylate, an alkyd resin, an acrylic modified alkyd resin, chlorinated rubber and polybutadiene. The dispersoid used in the invention includes ethylenically unsaturated monomers, e.g. acrylic monomers such as methyl acrylate or methacrylate, ethyl acrylate or methacrylate, butyl acrylate or methacrylate and 2-hydroxyethyl acrylate, acrylonitrile and styrene. The ethylenically unsaturated monomers may be employed alone or in admixture thereof. A mixture of methyl methacrylate and ethyl and butyl acrylates is preferably employed in the present invention, and in particular, the mixture containing 20 to 70% by weight of methyl methacrylate is preferred.

Preferable non-aqueous dispersions are obtained by the polymerization of a monomer mixture containing methyl methacrylate in the aliphatic or aromatic hydrocarbon dispersion medium in the presence of the above-mentioned dispersant.

The non-aqueous dispersions preferably used in the present invention are those having a heating residue (solids content) of from 50 to 70% by weight and containing a polymer having a molecular weight of 10,000 to 20,000 and a glass transition temperature of 20° to 70° C. The ratio of the dispersoid to the dispersant is from about 70/30 to 80/20 by weight. It is important to adjust the monomer composition of the dispersoid so that the glass transition temperature of the polymer in the obtained dispersion falls within the above range. When the proportion of methyl methacrylate in the monomer mixture used as a dispersoid is made high, the glass transition temperature becomes high and the apparent drying rate of a coated paint becomes fast, but a film is hard to be formed and cracking is easy to occur. On the other hand, when the proportion of methyl methacrylate is decreased to lower the glass transition temperature, the film forming property is raised, but the drying property is remarkably lowered. Also, when the molecular weight of the polymer is far higher than the above range, the viscosity of the polymer increases and the stability of the paint is lowered. When the molecular weight is small, the film forming property tends to be improved, but the characteristics of non-aqueous dispersions are not effectively exhibited.

In addition to the non-aqueous resin dispersion, other resins compatible with the dispersion, such as alkyd resins, acrylic resins and chlorinated rubber may be employed in the present invention.

The non-aqueous dispersion is employed in an amount of 10 to 40% by weight based on the traffic marking paint.

Usual color pigments such as titanium dioxide and chrome yellow are employed in the present invention.

As a filler, there are preferably employed inorganic fine particles which are capable of imparting the hardness and the abrasion resistance to coatings so that the coatings possess the durability. Examples of the filler are, for instance, calcium carbonate, talc, silica sand, magnesium carbonate, dolomite, a glass powder, and the like. The filler is employed in an amount of 40 to 60% by weight based on the paint.

The traffic marking paint of the present invention may contain other usual paint additives, e.g. solvent, pigment dispersing agent, viscosity controller, coalescing agent and stabilizer.

The pigmentation is carried out by a usual grinding method, and for instance, a sand mill, a colloid mill, DYNO-MILL (registered trademark of WILLY A. BACHOFEN AG, Swiss) and a dissolver are usable. The paint is prepared in a manner such as a manner in which the whole amounts of the components are admixed at one time and ground, and a manner in which a mill base is first formed by employing an alkyd resin or the like, and after grinding it, the non-aqueous dispersion is admixed therewith.

The traffic marking paint of the present invention has a viscosity of 90 to 140 KU measured by a Krebs-Stormer viscometer at 25° C. according to Japanese Industrial Standard (JIS) K 5665-1981 and a heating residue of about 70 to about 90%.

The traffic paint may be employed with glass beads incorporated therein to provide a beaded reflecting paint. In that case, the glass beads may be previously incorporated in the paint upon preparing it.

The coating of the traffic paint of the present invention can be made in any known manners such as air spraying and airless spraying. The traffic paint may be coated at ordinary temperature, but the spraying of the paint heated to lower the viscosity at a temperature of not more than 80° C. is preferable, since the film formation is good and the paint can be coated in thick. In that case, a conventional hot marking car or heat spraying equipment can be directly used. In case of hot airless spraying, the spraying from a nozzle of 1.0 to 1.4 mm. in diameter at 80° C. in temperature of the paint and 80 to 110 kg./cm.$^2$ in spraying pressure is suitable. The spraying is conducted usually to give a coating having a thickness of 300 to 1,000 μm. in wet state and 200 to 600 μm. in dry state. When the thickness of the coating is less than the above range, the coating is insufficient in durability, and when the thickness is more than the above range, the inside portion of the coating is hard to be dried due to drying in the surface area.

The traffic paint of the present invention can be used as it is or with glass beads to provide a reflective coating. In case of providing a reflective coating by employing the traffic paint of the present invention, the so-called drop-in application system in which glass beads are incorporated in the sprayed paint being dropping from a spray nozzle is rather suitable than the so-called drop-on application system in which glass beads are scattered on the coated paint.

The present invention is more specifically described and explained by means of the following Examples in which all % and parts are by weight unless otherwise noted. It is to be understood that the present invention is not limited to the Examples and various changes and modifications may be made in the invention without departing from the spirit and scope thereof.

EXAMPLE 1

[Non-aqueous resin dispersion A]

Dispersoid: Acrylic polymer containing 45% of methyl methacrylate units
Dispersant: Alkyd resin
Dispersion medium: n-Heptane
Dispersoid/dispersant ratio: 70/30 by weight
Glass transition temp.: 35° C.
Heating residue: 60%

The above non-aqueous dispersion A was admixed with other additives according to the following formulation and the grinding was conducted by employing a colloid mill to give a traffic marking paint.

| Components | Amount (part) |
|---|---|
| Non-aqueous dispersion A | 18.0 |
| Medium-oil alkyd resin | 14.0 |
| Rutile titanium dioxide | 14.0 |
| Calcium carbonate | 51.5 |
| Dispersion stabilizer | 0.5 |
| Cyclohexane | 2.0 |
| (Total | 100.0) |

EXAMPLE 2

[Non-aqueous resin dispersion B]

Dispersoid: Acrylic polymer containing 20% of methyl methacrylate units
Dispersant: Acrylic modified alkyd resin
Dispersion medium: n-Heptane
Dispersoid/dispersant ratio: 70/30 by weight
Glass transition temp.: 24° C.
Heating residue: 55%

A traffic marking paint was prepared according to the following formulation by employing a colloid mill.

| Components | Amount (part) |
|---|---|
| Non-aqueous dispersion B | 30.0 |
| Medium-oil alkyd resin | 3.0 |
| Rutile titanium dioxide | 14.0 |
| Calcium carbonate | 34.5 |
| Dolomite | 16.0 |
| Dispersion stabilizer | 0.5 |
| n-Heptane | 2.0 |
| (Total | 100.0) |

EXAMPLE 3

[Non-aqueous resin dispersion C]

Dispersoid: Acrylic polymer containing 60% of methyl methacrylate units
Dispersant: Acrylic modified alkyd resin
Dispersion medium: n-Heptane
Dispersoid/dispersant ratio: 70/30 by weight
Glass transition temp.: 55° C.
Heating residue: 55%

A traffic marking paint was prepared according to the following formulation by employing a colloid mill.

| Components | Amount (part) |
|---|---|
| Non-aqueous dispersion C | 17.0 |
| Medium-oil alkyd resin | 16.0 |
| Rutile titanium dioxide | 14.0 |
| Calcium carbonate | 34.5 |
| Dolomite | 16.0 |
| Dispersion stabilizer | 0.5 |
| Cyclohexane | 2.0 |
| (Total | 100.0) |

EXAMPLE 4

[Non-aqueous resin dispersion D]

Dispersoid: Acrylic polymer containing 15% of methyl methacrylate units
Dispersant: Acrylic polymer
Dispersion medium: Mixed solvent of n-heptane and toluene
Dispersoid/dispersant ratio: 80/20 by weight
Glass transition temp.: 18° C.
Heating residue: 50%

A traffic marking paint was prepared according to the following formulation by employing a colloid mill.

| Components | Amount (part) |
|---|---|
| Non-aqueous dispersion D | 30.0 |
| Medium-oil alkyd resin | 2.0 |

-continued

| Components | Amount (part) |
|---|---|
| Rutile titanium dioxide | 14.0 |
| Calcium carbonate | 51.5 |
| Dispersion stabilizer | 0.5 |
| n-Heptane | 2.0 |
| (Total | 100.0) |

EXAMPLE 5

[Non-aqueous resin dispersion E]

Dispersoid: Acrylic polymer containing 70% of methyl methacrylate units
Dispersant: Acrylic modified alkyd resin
Dispersion medium: Mixed solvent of n-heptane and toluene (70/30 by volume)
Dispersoid/dispersant ratio: 70/30 by weight
Glass transition temp.: 79° C.
Heating residue: 60%

A traffic marking paint was prepared according to the following formulation by employing a colloid mill.

| Components | Amount (part) |
|---|---|
| Non-aqueous dispersion E | 16.0 |
| Medium-oil alkyd resin | 16.0 |
| Rutile titanium dioxide | 14.0 |
| Calcium carbonate | 34.5 |
| Dolomite | 16.0 |
| Dispersion stabilizer | 0.5 |
| n-Heptane | 2.0 |
| (Total | 100.0) |

EXAMPLE 6

[Non-aqueous resin dispersion F]

Dispersoid: Acrylic polymer containing 60% of methyl methacrylate units
Dispersant: Acrylic modified alkyd resin
Dispersion medium: Mixed solvent of n-heptane and toluene (70/30 by volume)
Dispersoid/dispersant ratio: 70/30 by weight
Glass transition temp.: 35° C.
Heating residue: 55%

A traffic paint was prepared according to the following formulation by employing a dissolver.

| Components | Amount (part) |
|---|---|
| Non-aqueous dispersion F | 13.0 |
| Medium-oil alkyd resin | 12.0 |
| Rutile titanium dioxide | 15.0 |
| Calcium carbonate | 39.0 |
| Glass beads | 15.0 |
| Dispersion stabilizer | 1.0 |
| Cyclohexane | 5.0 |
| (Total | 100.0) |

Yellow traffic paints were also prepared in the same manner as in the above Examples except that titanium dioxide was replaced by chrome yellow pigment.

In the above Examples in which there were employed non-aqueous dispersions of resins having different glass transition points, the alkyd resin was employed as a modifier to balance the drying property of the paints and physical properties of the obtained coatings. In case that the glass transition point was high, the alkyd resin was employed in a larger amount, and in case that the glass transition point was low, the alkyd resin was employed in a smaller amount. A modifier such as alkyd resin, acrylic resin or chlorinated rubber should be employed in an amount smaller than the non-aqueous resin dispersion, since when the midifier is employed in an amount larger than the non-aqueous dispersion, the characteristics of the non-aqueous dispersion are lost.

The traffic paints of the present invention obtained in the above Examples and two kinds of conventional alkyd resin traffic paints of heat spraying type (Comparative Examples 1 and 2) were tested according to JIS K 5665 "Traffic paint 2nd Class".

The results are shown in Table 1.
The testing methods are as follows:
Viscosity: JIS K 5665, item 5.5
Heating residue: JIS K 5665, item 5.19
Specific gravity: JIS K 5665, item 5.4
Appearance of coating: JIS K 5665, item 5.9
Drying time, no pick up: JIS K 5665, item 5.10, time till a paint does not stick to a tire
Whiteness: JIS K 5400, item 6.6, 45°-0° diffuse reflectance
Bleeding: JIS K 5665, item 5.13, 45°-0° diffuse reflectance
Water resistance: JIS K 5665, item 5.17, 24 hours
Alkali resistance: JIS K 5665, item 5.18, saturated solution of calcium hydroxide, 18 hours
Weather resistance: JIS K 5665, item 5.24, 12 months
Beads fixing rate: JIS K 5665, item 5.22
Abrasion resistance: JIS K 5665, item 5.15, 100 rotations

TABLE 1

| | Ex. 1 | Ex. 2 | Ex. 3 | Ex. 4 |
|---|---|---|---|---|
| Non-aqueous dispersion | | | | |
| Glass transition point (°C.) | 35 | 24 | 55 | 18 |
| Properties of paint | | | | |
| Viscosity (KU value at 25° C.) | 110 | 100 | 100 | 95 |
| Heating residue (%) | 85 | 84 | 86 | 84 |
| Specific gravity (at 20° C.) | 1.65 | 1.66 | 1.68 | 1.65 |
| Properties of coating | | | | |
| Appearance | pass | pass | pass | pass |
| Drying time, no pick up (min.) | | | | |
| Thickness 10 mil | 1 | 1.5 | 1 | 2.5 |
| 20 mil | 3 | 5 | 3 | 7 |
| 30 mil | 7 | 10 | 6.5 | >10 |
| Whiteness (reflectance) | 91 | 92 | 90 | 88 |
| Bleeding (reflectance) | 87 | 89 | 86 | 84 |
| Water resistance | pass | pass | pass | pass |
| Alkali resistance | " | " | " | " |
| Weather resistance | " | " | " | " |
| Beads fixing rate (over 90%) | " | " | " | " |
| Abrasion resistance (mg.) | 140 | 120 | 140 | 180 |

| | Ex. 5 | Ex. 6 | Com. Ex. 1 | Com. Ex. 2 |
|---|---|---|---|---|
| Non-aqueous dispersion | | | | |
| Glass transition point (°C.) | 79 | 35 | — | — |
| Properties of paint | | | | |
| Viscosity (KU value at 25° C.) | 105 | (35 poises at 20° C.) | 125 | 95 |
| Heating residue (%) | 85 | 83 | 81 | 75 |
| Specific gravity (at 20° C.) | 1.66 | 1.90 | 1.77 | 1.60 |
| Properties of coating | | | | |
| Appearance | pass | pass | pass | pass |
| Drying time, no pick up (min.) | | | | |
| Thickness 10 mil | 1 | 1 | 3 | 8 |
| 20 mil | 3 | 2 | 10 | >10 |
| 30 mil | 8 | 4 | >10 | >10 |
| Whiteness (reflectance) | 91 | 90 | 86 | 85 |
| Bleeding (reflectance) | 89 | 87 | 81 | 78 |
| Water resistance | pass | pass | pass | pass |
| Alkali resistance | " | " | " | " |

TABLE 1-continued

| | | | | |
|---|---|---|---|---|
| Weather resistance | " | " | " | " |
| Beads fixing rate (over 90%) | " | " | " | " |
| Abrasion resistance (mg.) | 280 | 70 | 230 | 250 |

The traffic paints of Examples 1 to 3 are far superior in drying property and abrasion resistance to conventional alkyd resin traffic paints of Comparative Examples 1 and 2, and these results show that the traffic paints of the present invention have an excellent practicality.

The traffic paint of Example 4 using a non-aqueous dispersion of a resin having a low glass transition temperature is somewhat slow in drying speed. The traffic paint of Example 5 using a non-aqueous dispersion of a resin having a high glass transition temperature is good in apparent drying property, but the film forming property is poor and it causes cracks on the surface of the coating.

The traffic paint of Example 6 in which glass beads are incorporated to provide a reflective coating, has an excellent drying property. Even if the paint was coated in wet thickness of 0.8 to 1.0 mm., it did not show the phenomenon that the inside portion of the coated paint remained undried.

In addition to the components used in the Examples, other components can be used in the Examples as set forth in the specification to obtain substantially the same results.

What is claimed is:

1. A traffic marking paint comprising 10 to 40% by weight of a non-aqueous dispersion of a resin having a glass transition temperature of 20° to 70° C. and having a molecular weight of 10,000 to 20,000, 40 to 60% by weight of a filler, and a pigment, said paint having a solids content of 70 to 90% by weight, said non-aqueous dispersion having a solids content of 50 to 70% by weight and being prepared by polymerizing an ethylenically unsaturated monomer selected from the group consisting of methyl acrylate, methyl methacrylate, ethyl acrylate, ethyl methacrylate, butyl acrylate, butyl methacrylate, 2-hydroxyethyl acrylate, acrylonitrile and styrene in a dispersion medium in the presence of a dispersant selected from the group consisting of an acrylic resin, an alkyd resin, an acrylic modified alkyd resin, chlorinated rubber and polybutadiene, the ratio of said ethylenically unsaturated monomer to said dispersant being from about 70/30 to about 80/20 by weight.

* * * * *